No. 828,402. PATENTED AUG. 14, 1906.
H. M. HART.
DEVICE FOR SECURING CROSS PINS IN PISTONS.
APPLICATION FILED NOV. 14, 1903.

WITNESSES:

INVENTOR.
Harry M. Hart
BY
ATTORNEY.

UNITED STATES PATENT OFFICE.

HARRY M. HART, OF PHILADELPHIA, PENNSYLVANIA, ASSIGNOR OF ONE-HALF TO JAMES G. HEASLET, OF PHILADELPHIA, PENNSYLVANIA.

DEVICE FOR SECURING CROSS-PINS IN PISTONS.

No. 828,402. Specification of Letters Patent. Patented Aug. 14, 1906.

Application filed November 14, 1903. Serial No. 181,161.

*To all whom it may concern:*

Be it known that I, HARRY M. HART, a citizen of the United States of America, residing in the city and county of Philadelphia, in the State of Pennsylvania, have invented a certain new and useful Improvement in Devices for Securing Cross-Pins in Pistons, of which the following is a true and exact description, reference being had to the accompanying drawings, which form a part thereof.

My invention relates to pistons having cross pins secured to them, to which coupling-rods are united, as is shown, for instance, with gas-engines, the object of my invention being to provide simple and efficient means for securing the cross-pins in place.

The nature of my invention will be best understood as described in connection with the drawings in which it is illustrated, and in which—

Figure 1:
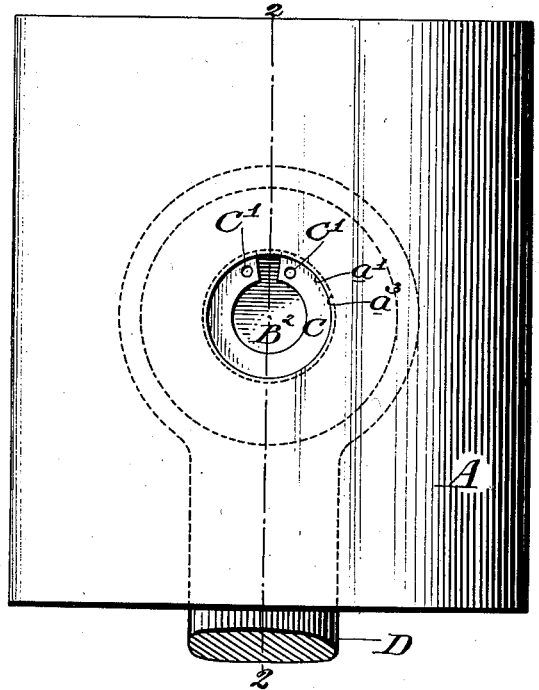
Figure 3:
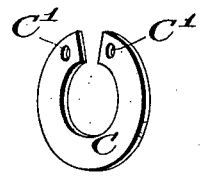
Figure 2:
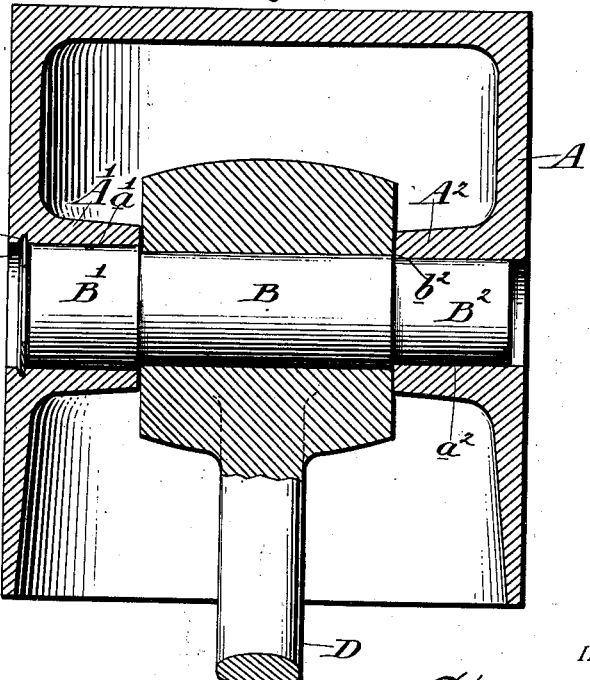

Figure 1 is a side elevation of the piston, showing the nature of the cross-pin and the device for securing the pin in place. Fig. 2 is a longitudinal cross-section through the piston, taken as on the line 2 2 of Fig. 1; and Fig. 3 is a perspective view of a split ring used to hold the pin in place.

A is the piston, which is hollow, formed with inwardly-extending bearing-bosses, (indicated at A' and A².) The internal diameter of these bearings is preferably different, that indicated at $a'$ being greater than that indicated at $a^2$. In the larger bearing and near the outer end thereof is formed an annular slot, (indicated at $a^3$.)

B is the cross-pin, the ends B' and B² of the pin being adapted to fit in the bearings $a'$ and $a^2$, as shown, and by preference the pin is formed with a shoulder $b^2$, which fits against the inner end of the bearing-boss A².

C is a split elastic ring shown as formed with perforations C' C' at its ends, by which it can be drawn together and made smaller, so as to pass into the bearing $a'$ and into registry with the slot $a^3$, into which it is then permitted to extend, as shown in Figs. 1 and 2, being held securely in place by the slot and forming an abutment which prevents the withdrawal of the pin B.

I have indicated at D the end of the connecting-rod pivoted on the pin B.

My device is simple and entirely efficient and needs no further description.

Having now described my invention, what I claim as new, and desire to secure by Letters Patent, is—

1. A hollow piston having bearings for a cross-pin and an annular slot $a^3$, formed in a bearing, in combination with a pin supported in the bearings and an elastic split ring C, sprung into the slot $a^3$, to form an abutment for the pin.

2. A hollow piston having bearings A', and A², for a cross-pin, the bearing A², having a smaller diameter than bearing A', and said larger bearing A', having an annular slot $a^3$, formed in it, in combination with a pin B, having sections B' and B², fitting in the bearings, and a shoulder $b^2$, abutted against the end of bearing B², said pin B, having its section B', of such length as to lie inside of the slot $a^3$ and an elastic split ring C, sprung into slot $a^3$, to form an abutment for the section B', of the pin.

HARRY M. HART.

Witnesses:
 CHAS. A. MYERS.
 D. STEWART.